United States Patent

Miyauchi

[11] Patent Number: 5,220,571
[45] Date of Patent: Jun. 15, 1993

[54] SEMICONDUCTOR LASER DEVICE
[75] Inventor: Nobuyuki Miyauchi, Nara, Japan
[73] Assignee: Sharp Kabushiki Kaisha, Osaka, Japan
[21] Appl. No.: 850,670
[22] Filed: Mar. 13, 1992
[30] Foreign Application Priority Data Mar. 15, 1991 [JP] Japan .................. 3-51136

[51] Int. Cl.$^5$ .............................. H01S 3/10
[52] U.S. Cl. ...................... 372/23; 372/102; 372/50; 372/97; 372/44
[58] Field of Search ............... 372/23, 101, 102, 103, 372/43, 44, 36, 34, 50, 97; 257/680, 684, 88, 98, 81

[56] References Cited

U.S. PATENT DOCUMENTS

| | | | |
|---|---|---|---|
| 4,832,469 | 5/1989 | Noguchi et al. | 372/103 |
| 4,901,325 | 2/1990 | Kato et al. | 372/23 |
| 5,022,035 | 6/1991 | Hasegawa | 372/36 |
| 5,081,637 | 1/1992 | Fan et al. | 372/101 |

Primary Examiner—Georgia Y. Epps
Attorney, Agent, or Firm—Morrison & Foerster

[57] ABSTRACT

A semiconductor laser device comprising a semiconductor laser chip emitting infrared laser beams in a predetermined direction and a visible light source emitting visible light beams in the same direction. The semiconductor laser chip and the visible light source are disposed close to each other on a package stem. An optical element is disposed in a direction where both light beams are emitted so as to collimate or converge the visible light beams while allowing the infrared laser beams to pass therethrough without change. By this configuration, the operator can visually locate the infrared laser beams by knowing the location of the visible light beams.

6 Claims, 2 Drawing Sheets

SEMICONDUCTOR LASER DEVICE

BACKGROUND OF THE INVENTION

1. Field of the Invention

The present invention relates to a semiconductor laser device, and more particularly to a semiconductor laser device used as a light source for an optical communication system.

2. Description of the Prior Art

In the optical communication technology which uses optical fiber as a transmission medium, a light source capable of emitting infrared light beams in the band of 1300 nm or 1500 nm is used because, due to the physical properties of the optical fiber material, less loss is produced for the light beams in this infrared range during their transmission through the optical fiber. Conventionally, a semiconductor laser device as schematically shown in FIG. 6 has been used as a light source emitting infrared light beams in the above range. Such a semiconductor laser device comprises an infrared semiconductor laser chip 101 mounted on a package stem 103 with a heat sink 102 therebetween. These components are covered airtight with a cap provided with a glass window 105. Infrared laser beams 104 generated from the laser chip 101 are emitted outside through the glass window 105 with a spread of a predetermined angle.

The above conventional semiconductor laser device is disadvantageous in that the emitted laser beams having a peak wavelength of 1300 nm or more in the infrared range are not visible and therefore can not be visually located. In such a semiconductor laser device, an additional provision of a device for converting the emitted infrared laser beams 104 to visible light beams is required when the laser beams 104 are coupled to an optical fiber or introduced to a certain optical component, which results in inefficient operation. Further, since the laser beams 104 are not visible, the operator might look straight at the laser beams 104 without being aware of it, which may cause loss of eyesight if the laser chip 101 has a high power.

The objective of the present invention is to provide a semiconductor laser device in which laser beams emitted therefrom can be visually located, thereby securing improved efficiency and safety in the operation.

SUMMARY OF THE INVENTION

The semiconductor laser device of this invention, which overcomes the above-discussed and numerous other disadvantages and deficiencies of the prior art, comprises a semiconductor laser chip mounted on a package stem for emitting infrared laser beams in a predetermined direction, a visible light source mounted on the package stem in a close vicinity of the semiconductor laser chip for emitting visible light beams in the predetermined direction, and an optical element disposed in a direction where the infrared laser beams and the visible light beams are emitted, the optical element allowing the infrared laser beams to pass and collimating the visible light beams.

Alternatively, the semiconductor laser device of this invention comprises a semiconductor laser chip mounted on a package stem for emitting infrared laser beams in a predetermined direction, a visible light source mounted on the package stem in a close vicinity of the semiconductor laser chip for emitting visible light beams in the predetermined direction, and an optical element disposed in a direction where the infrared laser beams and the visible light beams are emitted, the optical element allowing the infrared laser beams to pass and converging the visible light beams on a predetermined point.

In a preferred embodiment, the visible light source is a semiconductor laser chip.

In a preferred embodiment, the visible light source is a light emitting diode.

Thus, according to the present invention, the visible light beams emitted from the visible light source are collimated or converged on a predetermined point with respect to the visible light source through the optical element, so that the operator can see the position of the visible light beams. At the same time, the infrared laser beams are emitted from the semiconductor laser chip in the same direction as the visible light beams. The light source and the laser chip are positioned close to each other. In this way, the operator can visually locate the infrared laser beams by knowing the location of the visible light beams. Accordingly, when the infrared laser beams are coupled to an optical fiber, or introduced to a certain optical component, the operator can use the visible light beams as a mark for the invisible infrared laser beams, thereby improving efficiency in the operation. Furthermore, the risk of the operator looking straight at the infrared laser beams is lessened, thus securing safety in the operation.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Example 1

Figure 1:
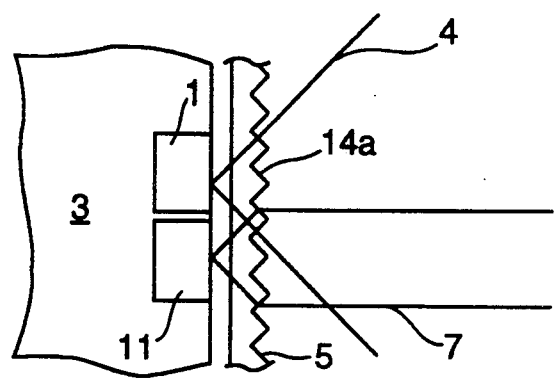
FIGS. 1 to 5 are schematic views of the first to fifth examples of the semiconductor laser device according to the present invention, respectively.

Referring to FIG. 1, a first example of a semiconductor laser device of the present invention comprises an infrared semiconductor laser chip 1 and a visible-light semiconductor laser chip 11. The two laser chips 1 and 11 are positioned close to each other on the same surface of a package stem 3. The semiconductor laser device further comprises a glass window 5 with a holographic diffraction grating 14a disposed on the outer surface thereof as an optical element. In the figure, a heat sink is omitted for simplification.

The infrared semiconductor laser chip 1 oscillates laser beams 4 having a peak wavelength of 1300 nm or more in the infrared range, and the oscillated infrared laser beams 4 are emitted toward the glass window 5 with a spread of a predetermined angle. On the other hand, the visible-light semiconductor laser chip 11 oscillates laser beams 7 having a peak wavelength of 830 nm or less in the visible light range (e.g., 660 nm), and the oscillated visible laser beams 7 are emitted in the same direction as the infrared laser beams 4 with a spread of a predetermined angle.

The holographic diffraction grating 14a on the glass window 5 collimates the visible laser beams 7 while allowing the infrared laser beams 4 to pass therethrough without change. The collimated visible laser beams 7 pass straight along the substantial center of the infrared laser beams 4 spreading at the predetermined angle. Accordingly, the operator can visually locate the infrared laser beams 4 by knowing the location of the visible laser beams 7. Consequently, when the infrared laser beams 4 are coupled to an optical fiber, or introduced to a certain optical component, the operator can use the visible laser beams 7 as a mark for the invisible infrared laser beams 4, thereby improving efficiency in the operation. At the same time, the risk of the operator looking straight at the infrared laser beams 4 is lessened, thus securing safety in the operation.

Example 2

Figure 2:
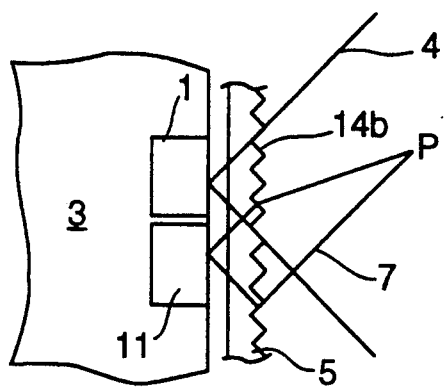

Referring to FIG. 2, a second example of a semiconductor laser device of the present invention comprises a holographic diffraction grating 14b disposed on the outer surface of the glass window 5. The holographic diffraction grating 14b converges the visible laser beams 7 on a predetermined point P with respect to the visible-light semiconductor laser chip 11 while allowing the infrared laser beams 4 to pass therethrough without change. Other structures of this example are same as those of Example 1. According to this example, like Example 1, the operator can visually locate the infrared laser beams 4 from the converged point P of the visible laser beams 7.

Example 3

Figure 3:
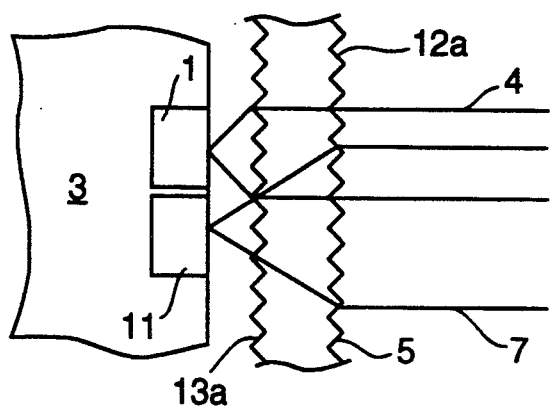

Referring to FIG. 3, a third example of a semiconductor laser device of the present invention comprises holographic diffraction gratings 12a and 13a formed on the outer and inner surfaces of the glass window 5, respectively. The holographic diffraction grating 12a collimates the visible laser beams 7 while allowing the infrared laser beams 4 to pass therethrough without change. On the other hand, the holographic diffraction grating 13a collimates the infrared laser beams 4 while allowing the visible laser beams 7 to pass therethrough without change. Other structures are same as those of Examples 1 and 2. As in Examples 1 and 2, the operator can visually locate the infrared laser beams 4 from the collimated visible laser beams 7.

Example 4

Figure 4:
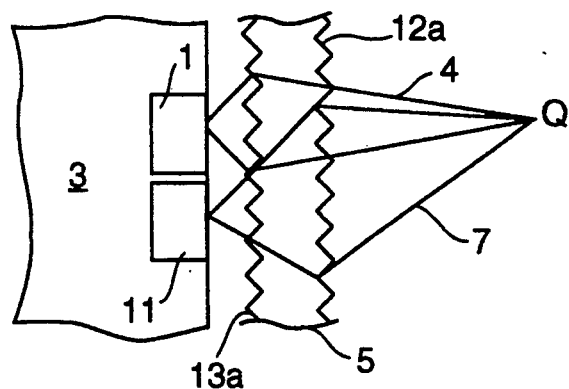

Referring to FIG. 4, a fourth example of a semiconductor laser device of the present invention comprises holographic diffraction gratings 12b and 13b formed on the outer and inner surfaces of the glass window 5, respectively. The holographic diffraction grating 12b converges the visible laser beams 7 on a predetermined point Q with respect to the visible-light semiconductor laser chip 11 while allowing the infrared laser beams 4 to pass therethrough without change. On the other hand, the holographic diffraction grating 13b converges the infrared laser beams 4 on the point Q where the visible laser beams 7 are converged through the holographic diffraction grating 12b while allowing the visible laser beams 7 to pass therethrough without change. Other structures are same as those of Examples 1 to 3. As in these examples, the operator can visually locate the infrared laser beams 4 from the converged point Q of the visible laser beams 7.

Example 5

Figure 5:
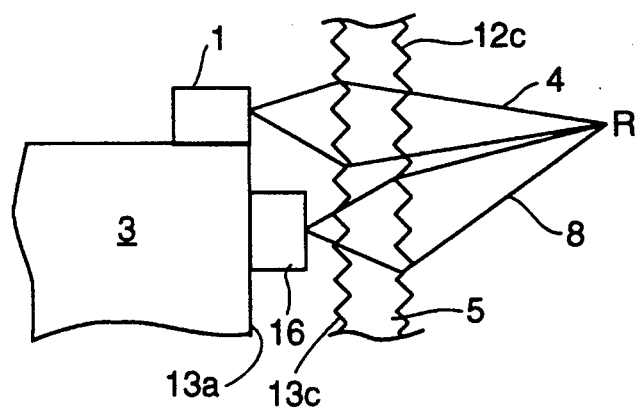

In the above examples, the semiconductor laser chip 11 emitting laser beams from a facet thereof was used as a source of visible light beams. It is also possible to use a light emitting diode in place of the semiconductor laser chip, and to use a light emitting element which emits light beams from a surface thereof, not from a facet thereof. FIG. 5 shows an example of a semiconductor laser device using a light emitting diode (LED) 16 which emits light beams from a surface thereof as a source of visible light beams.

Like Examples 1 to 4, the semiconductor laser device of this example comprises the infrared semiconductor laser chip 1 disposed on the package stem 3. The LED 16 is disposed on the front side 3a of the package stem 3 with the light emitting surface thereof facing the glass window 5.

Hologram diffraction gratings 12c and 13c are formed on the outer and inner surfaces of the glass window 5. The holographic diffraction grating 12c converges the visible laser beams 8 on a predetermined point R with respect to the LED 16 while allowing the infrared laser beams 4 to pass therethrough without change. On the other hand, the holographic diffraction grating 13c converges the infrared laser beams 4 on the point R where the visible laser beams 8 are converged through the holographic diffraction grating 12c while allowing the visible laser beams 8 to pass therethrough without change. As in Examples 1 to 4, the operator can visually locate the infrared laser beams 4 from the converted point R of the visible laser beams 8.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A semiconductor laser device comprising:
   a semiconductor laser chip mounted on a package stem for emitting infrared laser beams in a predetermined direction,
   a visible light source mounted on the package stem in a close vicinity of the semiconductor laser chip for emitting visible light beams in the predetermined direction, and
   an optical element disposed in a direction where the infrared laser beams and the visible light beams are emitted, the optical element allowing the infrared laser beams to pass and collimating the visible light beams.

2. A semiconductor laser device according to claim 1, wherein the visible light source is a semiconductor laser chip.

3. A semiconductor laser device according to claim 1, wherein the visible light source is a light emitting diode.

4. A semiconductor laser device comprising:
   a semiconductor laser chip mounted on a package stem for emitting infrared laser beams in a predetermined direction,
   a visible light source mounted on the package stem in a close vicinity of the semiconductor laser chip for emitting visible light beams in the predetermined direction, and
   an optical element disposed in a direction where the infrared laser beams and the visible light beams are emitted, the optical element allowing the infrared laser beams to pass and converging the visible light beams on a predetermined point.

5. A semiconductor laser device according to claim 4, wherein the visible light source is a semiconductor laser chip.

6. A semiconductor laser device according to claim 4, wherein the visible light source is a light emitting diode.

* * * * *

UNITED STATES PATENT AND TRADEMARK OFFICE
CERTIFICATE OF CORRECTION

PATENT NO. : 5,220,571

DATED : June 15, 1993

INVENTOR(S) : Nobuyuki Miyauchi

It is certified that error appears in the above-indentified patent and that said Letters Patent is hereby corrected as shown below:

In the Drawings:

In Fig. 4, please change the reference number "12a" to --12b--, and "13a" to --13b--.

In Fig. 5, please change the reference number "13a" to --3a--.

Figure 6:
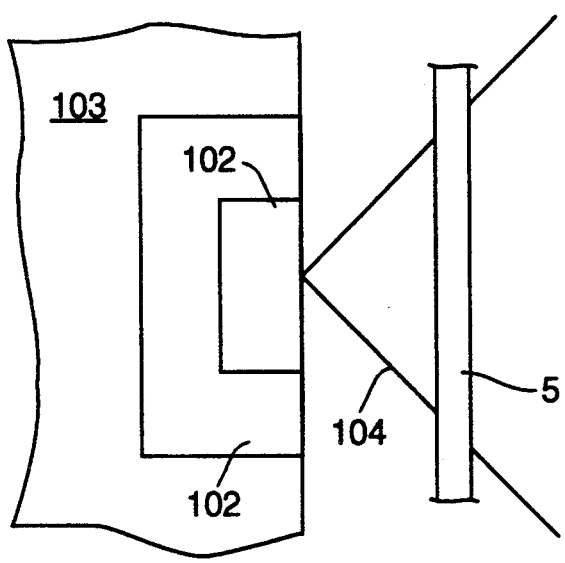
FIG. 6 is a schematic view of a conventional semiconductor laser device.
Figure 4:
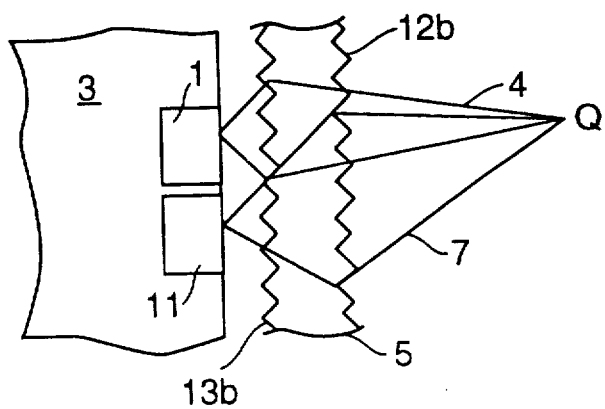
Figure 5:
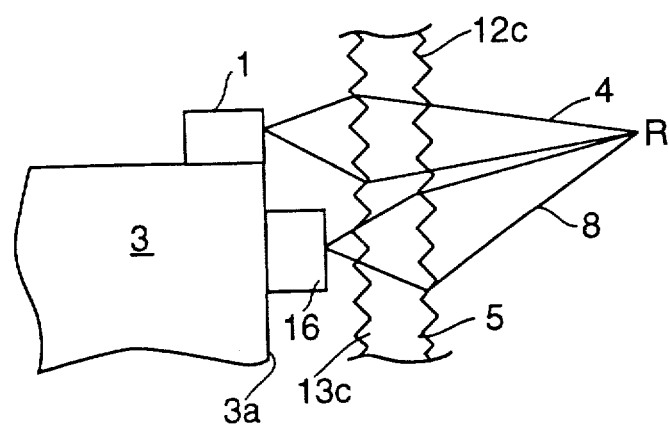
Figure 6:
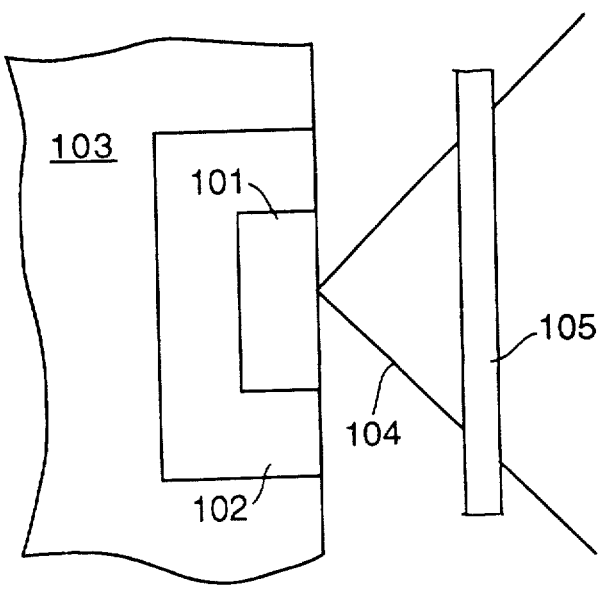

In FIG. 6, please change the reference number "102" located nearer the top of the figure to --101--, and change "5" to --105--.

Figures 4, 5 and 6, should read as shown on the attached page.

Signed and Sealed this

First Day of February, 1994

*Attest:*

BRUCE LEHMAN

*Attesting Officer*     Commissioner of Patents and Trademarks